United States Patent
Rimmington

(10) Patent No.: US 10,082,567 B2
(45) Date of Patent: Sep. 25, 2018

(54) LONGWALL SYSTEM CREEP DETECTION

(71) Applicant: Joy MM Delaware, Inc., Wilmington, DE (US)

(72) Inventor: Gareth Rimmington, South Yorks (GB)

(73) Assignee: Joy Global Underground Mining LLC, Warrendale, PA (US)

( * ) Notice: Subject to any disclaimer, the term of this patent is extended or adjusted under 35 U.S.C. 154(b) by 100 days.

(21) Appl. No.: 15/080,322

(22) Filed: Mar. 24, 2016

(65) Prior Publication Data

US 2017/0276777 A1 Sep. 28, 2017

(51) Int. Cl.
*E21C 35/08* (2006.01)
*E21C 35/24* (2006.01)
(Continued)

(52) U.S. Cl.
CPC .............. *G01S 13/08* (2013.01); *E21C 35/08* (2013.01); *E21C 35/24* (2013.01); *E21D 23/12* (2013.01);
(Continued)

(58) Field of Classification Search
CPC ..... E21D 23/14; E21D 23/142; E21D 23/144; E21D 23/148; E21D 23/12; E21C 35/08; E21C 35/12; E21C 35/14; E21C 35/24
(Continued)

(56) References Cited

U.S. PATENT DOCUMENTS

| | | |
|---|---|---|
| 4,093,309 A | 6/1978 | Mullins |
| 4,111,487 A | 9/1978 | Mullins |

(Continued)

FOREIGN PATENT DOCUMENTS

| | | |
|---|---|---|
| CA | 1229875 | 12/1987 |
| CN | 1818346 | 8/2006 |

(Continued)

OTHER PUBLICATIONS

Hargrave, C. O. et al., "Radar Level Sensor for Longwall Creep and Retreat Measurement", CSIRO Mining Automation, Queensland Centre for Advanced Technologies, 2007, pp. 2102-2109, Department of Computer Science and Electrical Engineering, The University of Queen Island, Brisbane, Australia.

(Continued)

*Primary Examiner* — David J Bagnell
*Assistant Examiner* — Michael A Goodwin
(74) *Attorney, Agent, or Firm* — Michael Best & Friedrich LLP

(57) ABSTRACT

Systems and methods are provided for detecting face creep of a longwall mining system. The system includes a detection device mounted in a maingate roadway and coupled to the detection device. The controller determines the position of the beam stage loader-armored face conveyor interface based on a signal from the first indicator device, determines a position of a maingate line based on a signal from a maingate indicator device, and determines a position of a belt conveyor based on a signal from a belt conveyor indicator device. The controller further determines a first distance between the position of the beam stage loader-armored face conveyor interface and a maingate line, and a second distance between the position of the belt conveyor and the maingate line. The controller generates an indication of face creep based on the first distance and the second distance.

14 Claims, 9 Drawing Sheets

(51) Int. Cl.
*E21D 23/12* (2006.01)
*G01S 13/08* (2006.01)
*G01S 15/08* (2006.01)
*G01S 17/08* (2006.01)
*G08B 5/36* (2006.01)
*G01S 17/88* (2006.01)
*G01S 13/88* (2006.01)
*G01S 15/88* (2006.01)

(52) U.S. Cl.
CPC .............. *G01S 13/88* (2013.01); *G01S 15/08* (2013.01); *G01S 15/88* (2013.01); *G01S 17/08* (2013.01); *G01S 17/88* (2013.01); *G08B 5/36* (2013.01)

(58) Field of Classification Search
USPC .................................................. 299/1.6, 1.7
See application file for complete search history.

(56) References Cited

U.S. PATENT DOCUMENTS

| | | | |
|---|---|---|---|
| 4,206,840 A | 6/1980 | Hanson | |
| 4,355,895 A | 10/1982 | Cairns et al. | |
| 4,453,846 A | 6/1984 | Mullins et al. | |
| 4,466,667 A | 8/1984 | Poulsen | |
| 5,020,860 A | 6/1991 | Bessinger et al. | |
| 5,145,235 A | 9/1992 | Smart | |
| 5,368,369 A * | 11/1994 | Maity | E21C 41/16 299/11 |
| 6,481,802 B1 | 11/2002 | Kussel | |
| 6,857,705 B2 | 2/2005 | Hainsworth et al. | |
| 7,494,190 B2 * | 2/2009 | Kussel | E21C 29/02 299/1.05 |
| 8,157,330 B2 | 4/2012 | Niederriter | |
| 8,240,773 B2 | 8/2012 | Hargrave et al. | |
| 8,523,287 B2 | 9/2013 | Bowles | |
| 8,708,421 B2 | 4/2014 | Junker et al. | |
| 8,777,325 B2 * | 7/2014 | Wesselmann | E21C 35/24 299/1.7 |
| 2009/0134692 A1 * | 5/2009 | Hargrave | E21F 17/185 299/12 |
| 2010/0276258 A1 * | 11/2010 | Bremhorst | B65G 15/26 198/812 |
| 2012/0091782 A1 | 4/2012 | Wesselmann et al. | |
| 2012/0098325 A1 | 4/2012 | Junker et al. | |
| 2013/0015043 A1 * | 1/2013 | Tout | B65G 23/44 198/810.04 |
| 2013/0269453 A1 * | 10/2013 | Morrison | E21F 17/18 73/865.8 |
| 2015/0061350 A1 | 3/2015 | Paterson | |
| 2015/0097411 A1 | 4/2015 | Bowles | |
| 2016/0061035 A1 | 3/2016 | Siegrist | |
| 2017/0226853 A1 | 8/2017 | Katrycz | |

FOREIGN PATENT DOCUMENTS

| | | | |
|---|---|---|---|
| CN | 1848346 | 10/2006 | |
| CN | 102353962 | 2/2012 | |
| CN | 104612682 A * | 5/2015 | ............ E21C 35/08 |
| GB | 1558154 A | 12/1979 | |
| GB | 2198606 A | 6/1988 | |
| PL | 192046 | 8/2006 | |
| PL | 220815 | 1/2016 | |
| WO | 33058031 A1 | 7/2003 | |
| WO | 2012031610 A1 | 3/2012 | |

OTHER PUBLICATIONS

Hargrave, C., "Radar Waypoint Navigator for Underfround Mining", Antennas and Propagation (EuCAP), 2014 8th European Conference, Apr. 6-11, 2014, pp. 3587-3591, IEEE, Brisbane, QLD, Australia.

U.S. Office Action for U.S. Appl. No. 15/080,344 dated Oct. 2, 2017 (8 pages).

Polish Search Report and Written Opinion for Application No. P.420919 dated Oct. 16, 2017 (3 pages with English translation included).

UK Search Report for Application No. GB1704648.3 dated Sep. 22, 2017 (3pages).

UK Search Report for Application No. GB1704649.3 dated Sep. 22, 2017 (3pages).

Polish Search Report and Written Opnion for Application No. P.420927 dated Oct. 17, 2017 (8 pages with English translation included).

* cited by examiner

LONGWALL SYSTEM CREEP DETECTION

RELATED APPLICATION

The present application is related to co-filed U.S. patent application Ser. No. 15/080,344, the entire contents of which are incorporated herein by reference.

FIELD OF THE INVENTION

The present invention relates to methods and systems for detecting movement of a conveyor system used in underground mining environments.

BACKGROUND

Longwall mining systems are used to mine a block of coal or other ore called a longwall block. The longwall block includes a coal face (or ore face) from which coal (or ore) is removed. Two roadways, a maingate roadway and a tailgate roadway, run along the sides of the longwall block and orthogonal to the coal face. The longwall mining system includes powered roof supports to support roof and overlying rock above the longwall system. A longwall shearer moves along the coal face of the longwall block, shearing coal from the coal face and onto an armored face conveyor (AFC). The armored face conveyor extends along the coal face and transports coal towards the maingate roadway. When coal has been hauled to the maingate roadway, a beam stage loader (BSL) connected to the armored face conveyor transfers the coal from the armored face conveyor, through a 90 degree turn, and onto a belt conveyor positioned along the maingate roadway. After the longwall shearer shears off a layer of the coal face, the longwall mining system moves forward to shear the next layer.

As the longwall mining system operates it is common for the whole structure to migrate or creep such that the distance between the beam stage loader and the walls of the maingate roadway decreases. This migration or creep of the longwall equipment may cause difficulty in gaining access to the longwall by personnel. Further, this migration or creep may also result in the longwall equipment rubbing against the maingate equipment and the walls of the maingate roadway causing damage to the longwall equipment.

SUMMARY

In one embodiment, the invention provides a system for detecting face creep of a longwall mining system. The system includes a detection device mounted in a maingate roadway and a first indicator device mounted on a conveyor of the longwall mining system to indicate a position of armored face conveyor-beam stage loader interface to the detection device. The system further includes a controller coupled to the detection device and configured to receive the position of armored face conveyor-beam stage loader interface and determine a first displacement of the position of armored face conveyor-beam stage loader interface from a maingate centerline. When the first displacement is greater than a predetermined amount, the controller generates an indication that face creep is a maingate lag. When the first displacement is less than a predetermined amount, the controller generates an indication that face creep is a maingate lead.

In one embodiment, the invention provides a system for detecting face creep of a longwall mining system. The system includes a detection device mounted in a maingate roadway and a first indicator device located at a beam stage loader-armored face conveyor interface to indicate a position of the beam stage loader-armored face conveyor interface to the detection device. The system further includes a controller, including an electronic processor and a memory, that is coupled to the detection device. The controller is configured to determine the position of the beam stage loader-armored face conveyor interface based on a signal from the first indicator device, and to determine a first distance between the position of the beam stage loader-armored face conveyor interface and a maingate line. The controller then generates an indication of face creep based on the first distance.

In another embodiment, the invention provides a method for detecting face creep of a longwall mining system. The method includes detecting, by a detection device, a position of a beam stage loader-armored face conveyor interface. The method further includes determining, by a controller coupled to the detection device, the position of the beam stage loader-armored face conveyor interface based on an output from the detection device and determining, by the controller, a first distance between the position of the beam stage loader-armored face conveyor interface and a maingate line. The method also includes generating, by the controller, an indication of face creep based on the first distance.

In another embodiment, the invention provides a controller for detecting face creep of a longwall mining system. The controller includes an electronic processor and executable instruction stored in a memory configured to detect face creep. The controller is configured to determine a position of a beam stage loader-armored face conveyor interface, determine a position of a maingate line, and determine a position of a belt conveyor. The controller is further configured to determine a first distance between the position of the beam stage loader-armored face conveyor interface and the maingate line, and to determine a second distance between the position of the belt conveyor and the maingate line. The controller then generates an indication of face creep based on the first distance and the second distance.

Before any embodiments of the invention are explained in detail, it is to be understood that the invention is not limited in its application to the details of the configuration and arrangement of components set forth in the following description or illustrated in the accompanying drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more electronic processors, such as a microprocessor and/or application specific integrated circuits ("ASICs"). As such, it should be noted that a plurality of hardware and software based devices, as well as a plurality of different structural components may be utilized to implement the invention. For example, "servers" and "computing devices" described in the specification can include one or more electronic processors, one or more computer-readable medium modules, one or more input/output interfaces, and various connections (e.g., a system bus) connecting the components.

Other aspects of the invention will become apparent by consideration of the detailed description and accompanying drawings.

DETAILED DESCRIPTION

In the following description, numerous specific details are set forth to provide a thorough understanding of the present invention. However, it will be apparent to one of skill in the art that the present invention may be practiced without one or more of these specific details. In other instances, well-known features have not been described in order to avoid obscuring the present invention.

Figure 1:
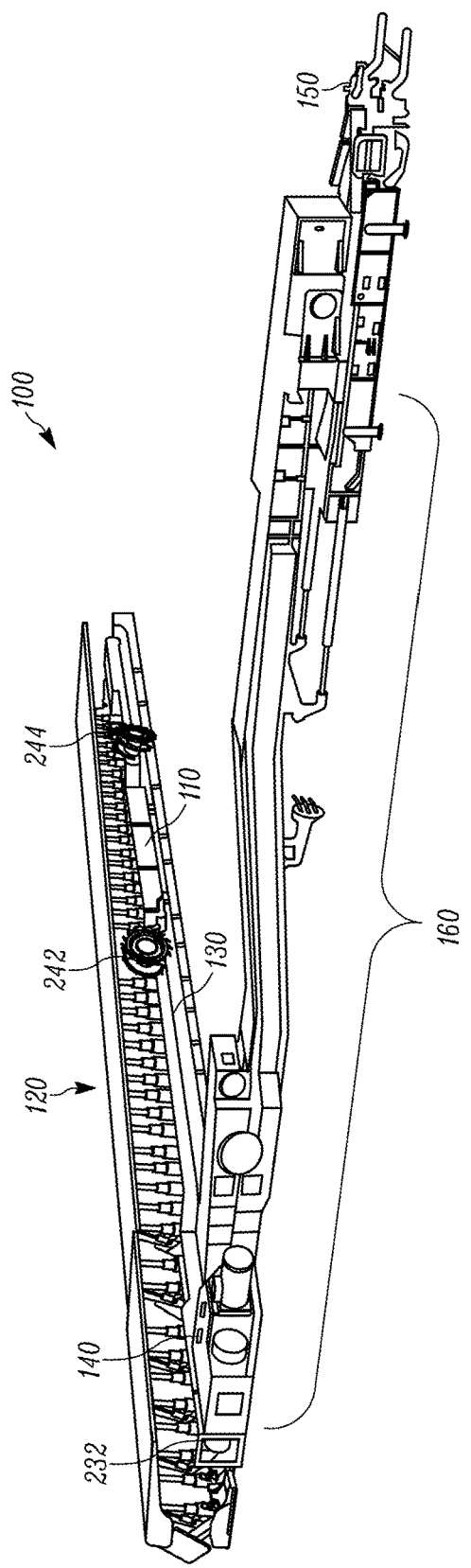
FIG. 1 is a perspective view of a longwall mining system, according to one embodiment of the invention.
Figure 2:
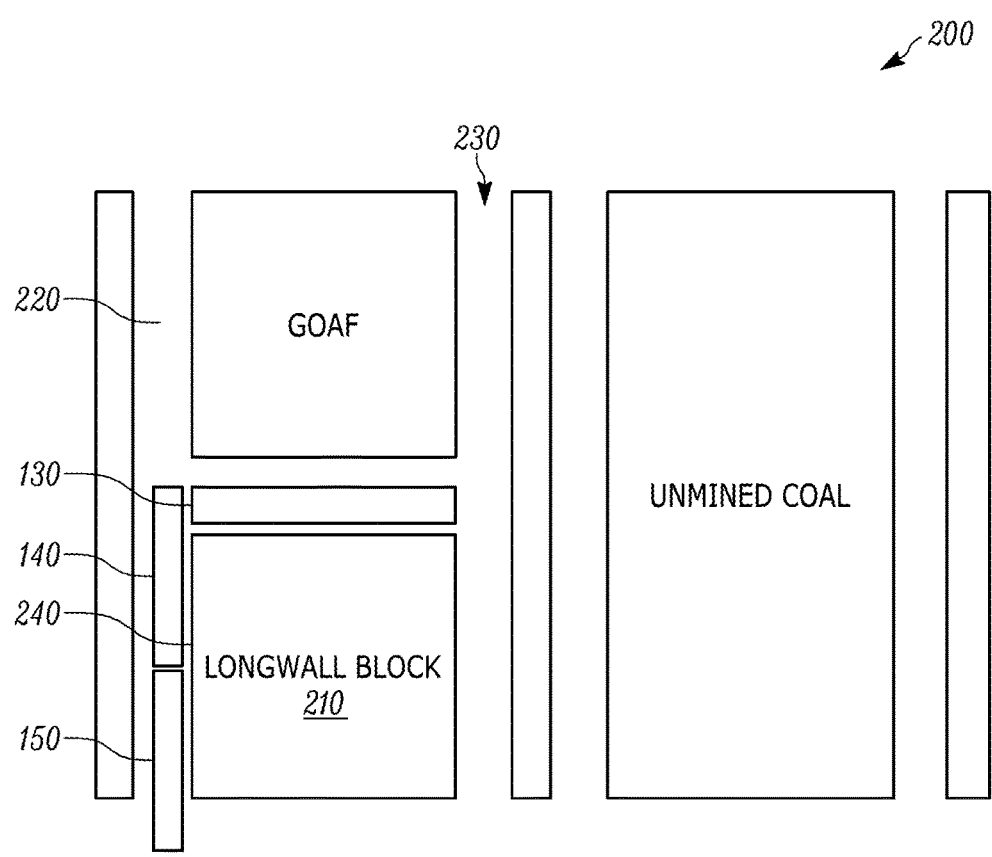
FIG. 2 illustrates an example of an underground mine in which the longwall mining system of FIG. 1 may be operated.

FIG. 1 illustrates a longwall mining system 100. In the example illustrated, the longwall mining system 100 includes, without limitation, a longwall shearer 110, powered roof supports 120, an armored face conveyor 130, a beam stage loader 140, a belt conveyor 150, and a monorail system 160. The longwall mining system 100 is used to mine a block of ore (e.g., coal) called a longwall block of an underground mine, such as an underground mine 200 shown in FIG. 2. As shown, the underground mine 200 includes a longwall block 210, a maingate roadway 220, and a tailgate roadway 230. The longwall block 210 includes an ore face 240 from which ore is mined. The two roadways, the maingate roadway 220 and the tailgate roadway 230, run along the sides of the longwall block 210 and orthogonal to the ore face 240.

Returning to FIG. 1, the longwall shearer 110 cuts ore from the ore face 240 of the longwall block 210. The longwall shearer 110 is located above the armored face conveyor 130 and cuts ore as it moves along the length of the ore face 240. In some embodiments, the longwall shearer 110 may be mounted on the armored face conveyor 130. The longwall shearer 110 may include one or more cutting drums 242 and 244. The cutting drums 242 and 244 are laced with cutting picks and rotate in a plane parallel to the ore face 240. When pushed into the ore face 240 and rotated, the cutting drums 242 and 244 cut ore from the ore face 240.

Once the ore is cut from the ore face 240, the ore falls onto the armored face conveyor 130, which transports the ore to a maingate end 232 of the armored face conveyor 130 at the maingate roadway 220. The armored face conveyor 130 extends along the length of the ore face 240 from the tailgate roadway 230 to the maingate roadway 220. The armored face conveyor 130 may include a series of steel pans able to move relative to each other by flexing. In some embodiments, ore is conveyed by steel bars of the armored face conveyor 130 arranged at 90 degrees to the length of the armored face conveyor 130 which are dragged along by a pair of circular chains.

At the maingate end 232 of the armored face conveyor 130, the ore is transferred to the beam stage loader 140. The beam stage loader 140 is located along the maingate roadway 220 extending along the rib or wall of the longwall block 210 from the maingate end 232 of the armored face conveyor 130 to the belt conveyor 150. In some embodiments, the beam stage loader 140 may have a flexible portion closer to the armored face conveyor 130 in order to transfer the ore through a 90 degree turn at the maingate end 232 of the armored face conveyor 130. In certain embodiments, the beam stage loader 140 may have a change of elevation along its length in order to discharge ore onto the belt conveyor 150. In some embodiments, the beam stage loader 140 may also include a crusher or breaker in order to prevent damage and to improve loading onto the belt conveyor 150. In some embodiments, similar to the armored face conveyor 130, ore is conveyed by steel bars of the beam stage loader 140, arranged at 90 degrees to the length of the beam stage loader 140, which are dragged along by a pair of circular chains. The beam stage loader 140 may be attached to a maingate drive and may be moved along the maingate roadway 220 or laterally within the maingate roadway 220. The belt conveyor 150 receives ore from the beam stage loader 140 and transports ore to the surface of the mine. The belt conveyor 150 may extend from the end of beam stage loader 140 to the surface.

The powered roof supports 120 support the roof of the underground mine 200 and advance the armored face conveyor 130 during the mining operation. The powered roof supports 120 are located along the ore face 240 providing support to the roof above the armored face conveyor 130 and the longwall shearer 110. In some embodiments, the powered roof supports 120 include a canopy and vertical and horizontal hydraulic cylinders. The canopy may be pressed against the roof by the vertical cylinders in order to support the roof during the mining operation, while the horizontal cylinders may be used to advance the powered roof supports 120 and the armored face conveyor 130 in a direction of retreat of the longwall block 210 (i.e., downward in FIG. 2).

The monorail system 160 supports certain maingate equipment used by the longwall mining system. For example, the monorail system 160 supports high pressure water and hydraulic hoses that are used to cool down the longwall shearer 110 during the mining process. The monorail system 160 also carries the power control and communications cables for the operation of the longwall mining system 100.

Although, in the above description, the longwall mining system 100 is shown with a specific arrangement of all the components, persons skilled in the art will recognize that the arrangement in FIG. 1 contemplates only an exemplary embodiment of the present invention. Other embodiments may include more or less components arranged differently than shown.

When one layer of the longwall block 210 is mined, the longwall mining system 100 retreats in the direction of the ore face 240 in order to mine the next, newly exposed layer of the longwall block 210.

Figure 3A:
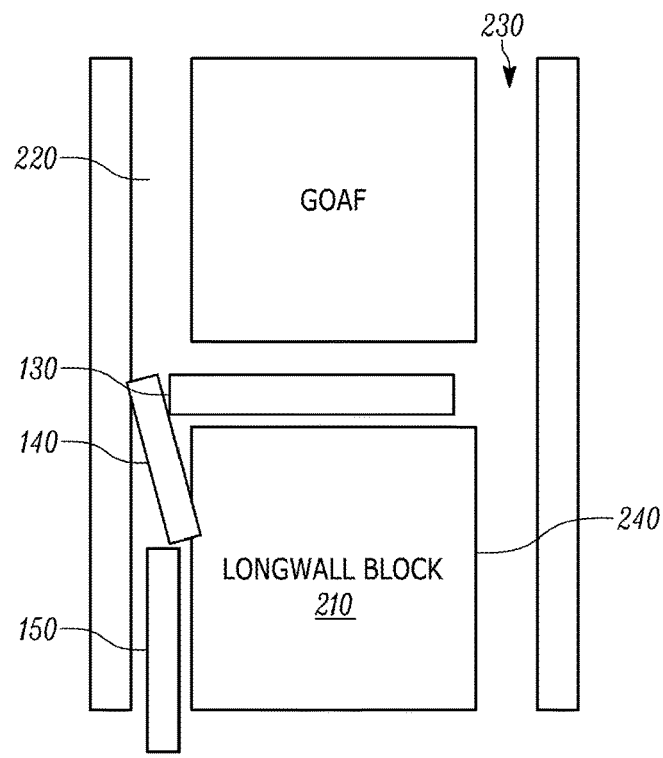
FIGS. 3A and 3B illustrate face creep of a longwall mining system.
Figure 3B:
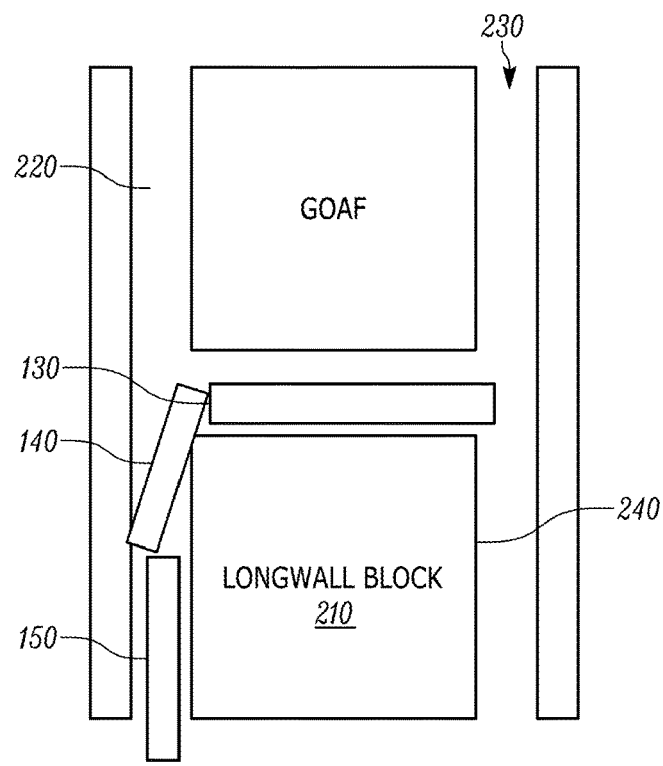

As the longwall mining system 100 operates, the components of the longwall mining system 100 may migrate or creep towards one of the two roadways. For example, as shown in FIG. 3A, the armored face conveyor 130 and beam stage loader 140 may migrate or creep towards the maingate roadway 220. Similarly, the armored face conveyor 130 and the beam stage loader 140 may migrate or creep towards tailgate roadway 230 as shown in FIG. 3B. This movement of the components of the longwall mining system 100 towards either of the roadways is referred to as "face creep." Face creep may result in limited clearance in the maingate roadway 220 preventing personnel from accessing the longwall shearer 110. Face creep may also result in damage to the beam stage loader 140 and the maingate equipment.

Figure 4:
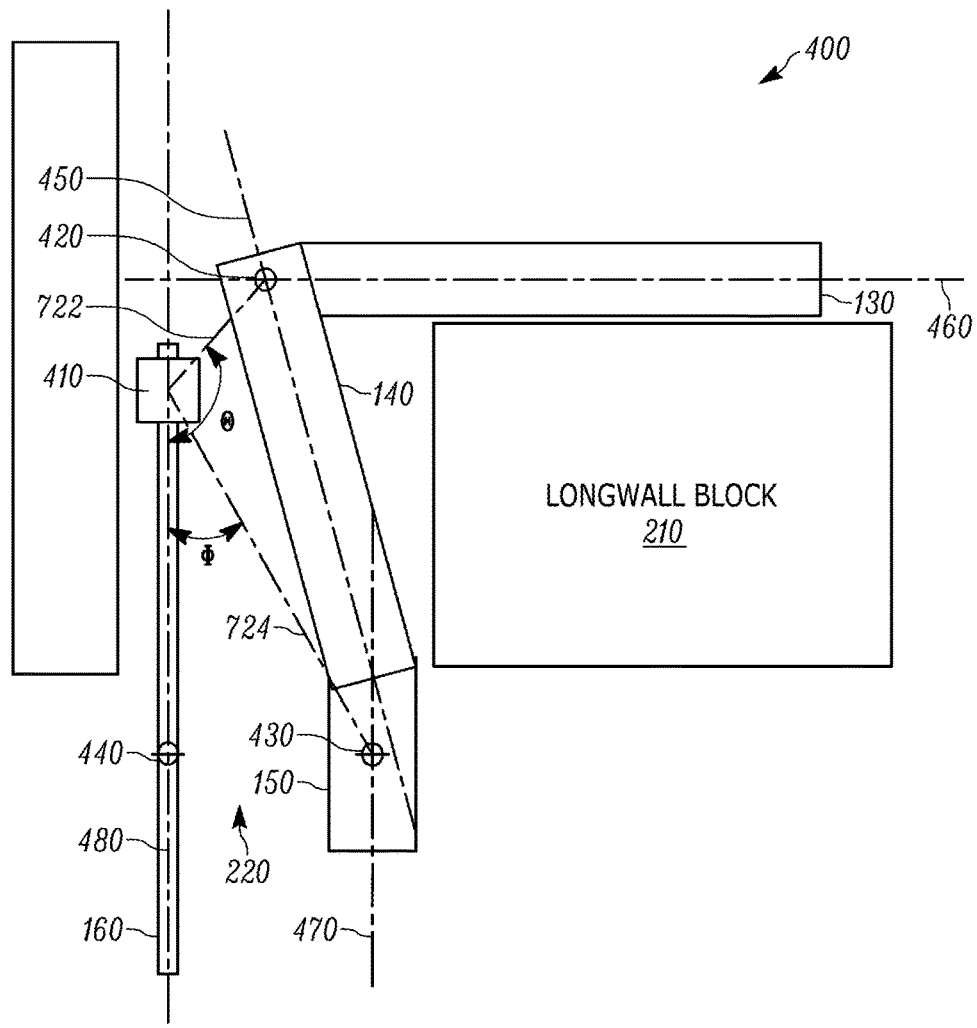
FIG. 4 illustrates a detection system used with the longwall mining system of FIG. 1 configured to implement one or more aspects of the present invention.

FIG. 4 illustrates a detection system 400 used with the longwall mining system 100 of FIG. 1 to detect face creep of the longwall mining system 100. In the example illustrated, the detection system 400 includes a detection device 410, a beam stage loader (BSL) indicator device 420, a conveyor indicator device 430, and a maingate indicator device 440.

The detection device 410 detects face creep by determining the relative positions of the components of the longwall mining system 100. The detection device 410 may be mounted on maingate equipment (for example, on the monorail system 160). In some embodiments, the detection device 410 may be located at other locations in the maingate roadway 220. The detection device 410 may include a radio detection and ranging (RADAR) device, a light radar (LIDAR) device, a sound navigation and ranging (SONAR) device or other known electronic measuring device capable of sensing angle and distance and/or spatial coordinates of an object.

The BSL indicator device 420 (e.g., a first indicator device) indicates a position of an interface of the beam stage loader 140 and the armored face conveyor, referred as a beam stage loader-armored face conveyor interface. The beam stage loader-armored face conveyor interface may be, for example, a location on the beam stage loader 140, the armored face conveyor 130, or the maingate end 232 that is generally indicative of the intersection of the beam stage loader and the armored face conveyor. The BSL indicator device 420 may be mounted on a centerline 450 of the beam stage loader 140. In some embodiments, the BSL indicator device 420 may be mounted at an intersection of the beam stage loader centerline 450 and armored face conveyor centerline 460, as shown in FIG. 4. Here, the beam stage loader-armored face conveyor interface is at the point at which the beam stage loader pivots relative to the armored face conveyer 130 as the armored face conveyor 130 creeps towards and away from the maingate roadway 220. In other embodiments, the BSL indicator device 420 may be mounted at other locations on the beam stage loader 140.

The conveyor indicator device 430 (e.g., a second indicator device) indicates a position of the belt conveyor 150 to the detection device 410. The conveyor indicator device 430 may be mounted on a centerline 470 of the belt conveyor 150 (as shown). In some embodiments, the conveyor indicator device 430 may be mounted at other locations of the belt conveyor 150.

The maingate indicator device 440 (e.g., a third indicator device) indicates a position of the maingate roadway 220 to the detection device 410. In particular, the maingate indicator device 440 indicates a location of a maingate line. The maingate line extends in a direction of the maingate roadway 220. For example, the maingate line is a centerline of the maingate roadway 220 (a maingate centerline 480), a centerline of the monorail system 160, or a line along a wall face on either side of the maingate centerline 480 that defines the maingate roadway 220. In some embodiments, the monorail centerline coincides with the maingate centerline 480. The maingate indicator device 440 may be mounted on the monorail system 160 or another location in the maingate roadway 220 to indicate the position of the maingate line. When the maingate indicator device 440 is not positioned on the maingate line, the detection device 410 may determine the position of the maingate line using a predetermined offset indicative of the offset of the maingate indicator device 440 from the maingate line. To simplify the discussion, the maingate centerline 480 is generally described and used as the maingate line herein for determining face creep. However, in some embodiments, the maingate line used for determining face creep may be offset from the maingate centerline 480. In some embodiments, the detection device 410 is positioned on the maingate centerline 480 and oriented at a setup stage such that the maingate centerline 480 is known to the detection device 410 without communicating with the maingate indicator device 440, which may not be present in the system in such embodiments.

In some embodiments, the detection device 410 includes a transmitter to transmit radio, light, or sound signals towards the indicator devices 420, 430 and 440. The indicator devices 420, 430 and 440 include reflectors that reflect the signals from the detection device 410. Alternatively, the indicator devices 420, 430 and 440 may include beacons that transmit radio, light or sound signals towards the detection device 410. The detection device 410 also includes a receiver to receive reflected or transmitted signals from the indicator devices 420, 430 and 440. In some embodiments, only one or two of the indicator devices 420, 430, and 440 may be used to determine face creep of the longwall mining system 100. Further, in some embodiments, the detection device 410 may include multiple receivers mounted at different locations to receive position data from the indicator devices 420, 430, and 440. In other embodiments, more indicator devices than illustrated in FIG. 4 may be used to determine face creep of the longwall mining system 100. Therefore, the number and position of the receivers and indicator devices illustrated are exemplary and should not be considered limiting.

Figure 5:
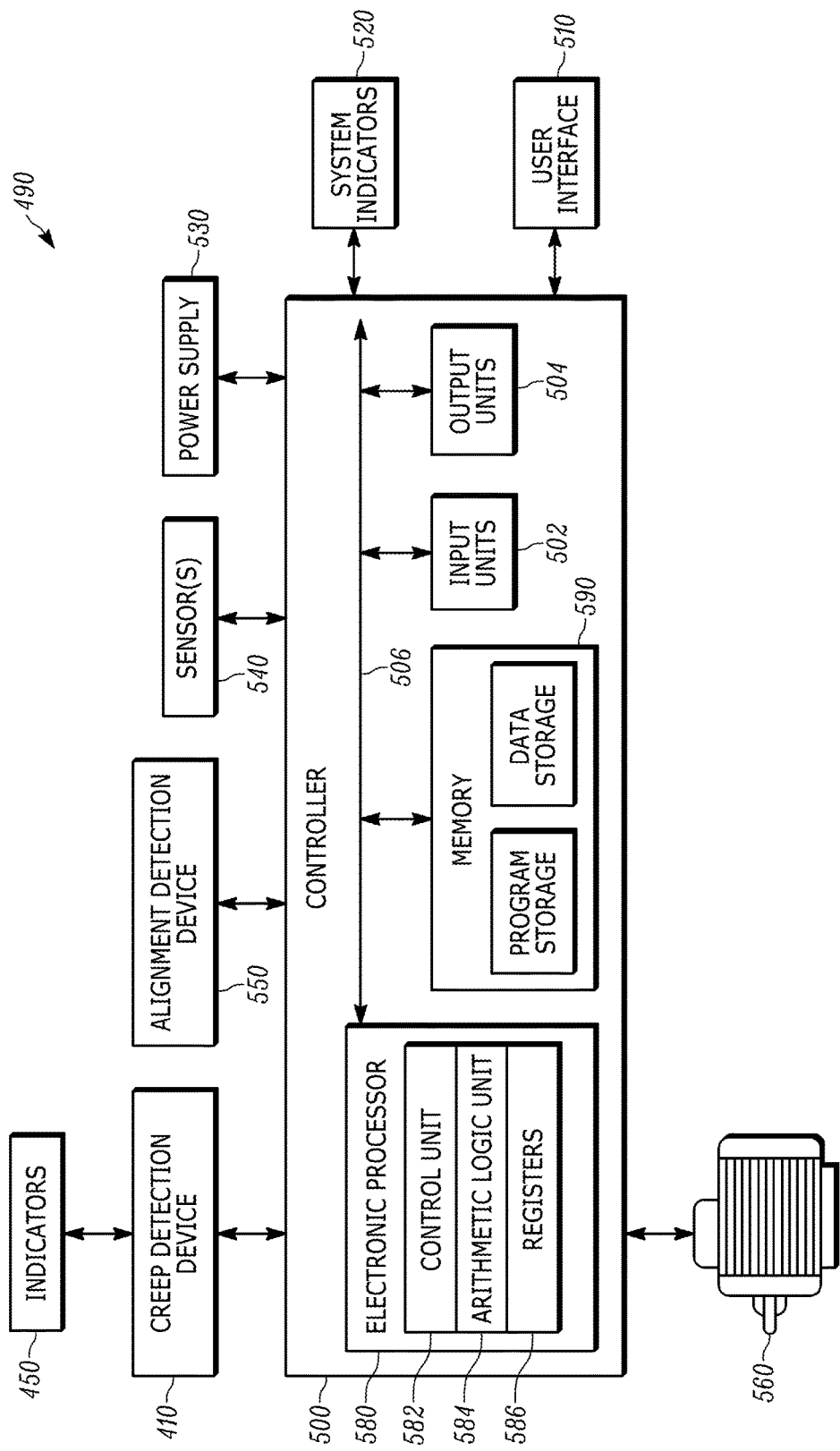
FIG. 5 illustrates a control system for the longwall mining system of FIG. 1 according to one embodiment of the invention.

FIG. 5 illustrates a control system 490 associated with the longwall mining system 100. The control system 490 includes a controller 500 coupled (e.g., electrically or communicatively) to a variety of additional modules or components, such as a user interface module 510, one or more system indicators 520, a power supply module 530, one or more sensors 540, the creep detection device 410, an alignment detection device 550, and a roof support drive mechanism and drive 560. It should be understood that FIG. 5 illustrates only one exemplary embodiment of a control system 490 and that the control system 490 may include more or less components and may perform additional functions other than those described herein.

The one or more sensors 540 are, for example, sensors configured or operable to measure or sense a characteristic of the longwall shearer 110 (e.g., a shearer position, a shearer speed, etc.), sensors configured or operable to measure or sense a characteristic of the conveyors, such as the armored face conveyor 130, the beam stage loader 140 and the belt conveyor 150 (e.g., a chain position, a chain speed, a chain tension, etc.), power transducers within the longwall mining system 100 configured or operable to measure or sense an electrical characteristic (e.g., current, voltage, power factor, torque, speed, input power, output power, etc.), load cells or sensors (e.g., tension sensors, load pins, etc.) operable to generate a signal related to a load of the conveyors, etc.

The controller 500 includes combinations of hardware and software that are operable to, among other things, generate an output regarding the health of the longwall mining system 100, control the operation of the longwall mining system 100, activate the one or more indicators 520 (e.g., a liquid crystal display ["LCD"]), and monitor the operation of the longwall mining system 100. In some embodiments, the controller 500 includes a plurality of electrical and electronic components that provide power, operational control, and protection to the components and modules within the controller 500 and/or the longwall mining system 100. For example, the controller 500 includes, among other things, an electronic processor 580 (e.g., a microprocessor, a microcontroller, or another suitable programmable device), a memory 590, input units 502, and output units 504. The electronic processor 580 includes, among other things, a control unit 582, an arithmetic logic unit ("ALU") 584, and a plurality of registers 586, and is implemented using a known computer architecture, such as a modified Harvard architecture, a von Neumann architecture, etc. The electronic processor 580, the memory 590, the input units 502, and the output units 504, as well as various modules connected to the controller 500 are connected by one or more control and/or data buses (e.g., common bus 506). The control and/or data buses are shown generally in FIG. 5 for illustrative purposes. The use of one or more control and/or data buses for the interconnection between and communications among the various modules and components would be known to a person skilled in the art in view of the invention described herein. In some embodiments, the controller 500 is implemented partially or entirely on a semiconductor chip, is a field-programmable gate array ("FPGA"), is an application specific integrated circuit ("ASIC"), is a proportional-integral-derivative (PID) controller, etc.

The memory 590 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices or data structures. The electronic processor 580 is connected to the memory 590 and executes software instructions that are capable of being stored in a RAM of the memory 590 (e.g., during execution), a ROM of the memory 590 (e.g., on a generally permanent basis), or another non-transitory computer readable medium such as another memory or a disc. Software included in the implementation of the longwall mining system 100 can be stored in the memory 590 of the controller 500. The software includes, for example, firmware, one or more applications, program data, filters, rules, one or more program modules, and other executable instructions. The controller 500 retrieves from memory and executes, among other things, instructions related to the control processes and methods described herein. In other constructions, the controller 500 includes additional, fewer, or different components.

The controller 500 may receive an indication of face creep from the creep detection device 410. Alternatively, the controller 500 determines a face creep from position data received from the creep detection device 410. In some embodiments, the controller 500 may also receive face alignment information from the alignment detection device 550. In some embodiments, the alignment detection device 550 is similar to the detection device disclosed in the co-pending U.S. patent application Ser. No. 15/080,344, titled "LONGWALL SYSTEM FACE ALIGNMENT DETECTION AND STEERING," the entire contents of which are hereby incorporated by reference. Although the creep detection device 410 and the alignment detection device 550 are shown as two separate components, in other embodiments, a combined detection device may be used to detect both face creep and face alignment.

The roof support drive mechanism and drive 560 is controlled by control signals received from the controller 500 or another associated controller. Each powered roof support 120 is associated with a section of the armored face conveyor 130 and uses a hydraulic ram to advance that section of the armored face conveyor 130. By controlling the amount of movement of the hydraulic rams, the drive 560 can change the angle of advance of the armored face conveyor 130. In some embodiments, the controller 500 controls the drive 560 and the longwall mining system 100 autonomously using the detection devices 410, 550, the one or more sensors 540 and one or more stored programs or modules. In other embodiments, the controller 500 controls the drive 560 and the longwall mining system 100 based on a combination of manual inputs and automatic controls.

The user interface module 510 provides an interface to receive user controls and to provide user feedback to control and monitor the longwall shearer 110, the conveyors 130, 140, 150, and/or the longwall mining system 100. For example, the user interface module 510 is operably coupled to the controller 500 to control the speed of the longwall shearer 110, the speed of the conveyors 130, 140, 150, the speed of the drive 560, the amount of retreat between shearer cycles etc. The user interface module 510 can include a combination of digital and analog input or output devices required to achieve a desired level of control and monitoring for the longwall mining system 100. For example, the user interface module 510 can include a display and input devices such as a touch-screen display, one or more knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. In other constructions, the display is a Super active-matrix OLED ("AMO-LED") display. The user interface module 510 can also be configured or operable to display conditions or data associated with the longwall mining system 100 in real-time or substantially real-time. For example, the user interface module 510 is configured or operable to display measured characteristics of the longwall mining system 100 (e.g., of the longwall shearer 110, the conveyors 130, 140, 150, etc.), the status of the longwall mining system 100, the amount of face creep of the longwall mining system 100, the face alignment of the longwall mining system 100 etc. In some implementations, the user interface module 510 is controlled in conjunction with the one or more indicators 520 (e.g., LEDs) to provide visual indications of the status or conditions of the longwall mining system 100 including the face creep and face alignment.

Although a single controller is illustrated in FIG. 5, in other constructions, the controller 500 may be separated into a plurality of controllers. For example, the controller 500 may be separated into a consolidated control unit ("CCU"), a programmable control unit ("PCU"), etc. The CCU can be housed in an explosion-proof enclosure and provides control over the conveyor system. The PCU is an intrinsically safe system that can be interfaced with the CCU for, among other things, stopping, inhibiting, tripping, etc., the operation of the conveyor.

As previously indicated, the detection device 410 determines the relative positions of the beam stage loader 140 and the belt conveyor 150 with respect to the position of the maingate centerline 480. The controller 500 receives this position information from the detection device 410. The controller 500 then processes and analyzes the position information to determine the face creep of the longwall mining system 100. In some embodiments, by determining the displacement of the beam stage loader-armored face conveyor interface and the belt conveyor centerline 470 with respect to the monorail or maingate centerline 480, the controller 500 determines the relative position of the beam stage loader-armored face conveyor (BSL-AFC) interface with respect to an ideal location. The controller 500 may iteratively determine the relative position of the BSL-AFC interface with respect to the ideal position and plot the trends to indicate the direction of the creep. In some embodiments, the controller 500 may also calculate a clearance distance between the beam stage loader 140 and the walls of the maingate roadway 220. In some embodiments, face creep is calculated as the difference between (a) the distance between the belt conveyor centerline 470 and the maingate centerline 480 and (b) the distance between the beam stage loader-armored face conveyor interface and the maingate centerline 480. Using this calculation, in some embodiments, it may desirable to have face creep equal to zero. The method of determining face creep of the longwall mining system 100 is described in more detail below with respect to FIGS. 6 and 7.

In some embodiments, the controller 500 may take corrective measures to alleviate face creep detected by the detection device 410. The controller 500 first determines whether the face creep indicates a maingate lead (for example, as shown in FIG. 3A) or a maingate lag (for example, as shown in FIG. 3B). The controller 500 then controls the roof support drive mechanism and drive 560 to move the conveyors 130, and 140 towards or away from the maingate roadway 220 in order to bring the face creep to zero. The method of correcting face creep of the longwall mining system 100 is described in more detail below with respect to FIGS. 8, 9A, and 9B.

The processes 600, 700 and 800 are associated with and described herein with respect to detecting a face creep of the longwall mining system 100 and controlling the movement of the longwall mining system 100 using the powered roof supports 120 based on the detection of face creep. Various steps described herein with respect to the processes 600, 700 and 800 are capable of being executed simultaneously, in parallel, or in an order that differs from the illustrated serial manner of execution. The processes 600, 700 and 800 may also be capable of being executed using fewer steps than are shown in the illustrated embodiment. Additionally, the controller 500 and the detection device 410 are operable to execute the processes 600, 700 and 800 at the same time or in tandem with other processes.

Figure 6A:
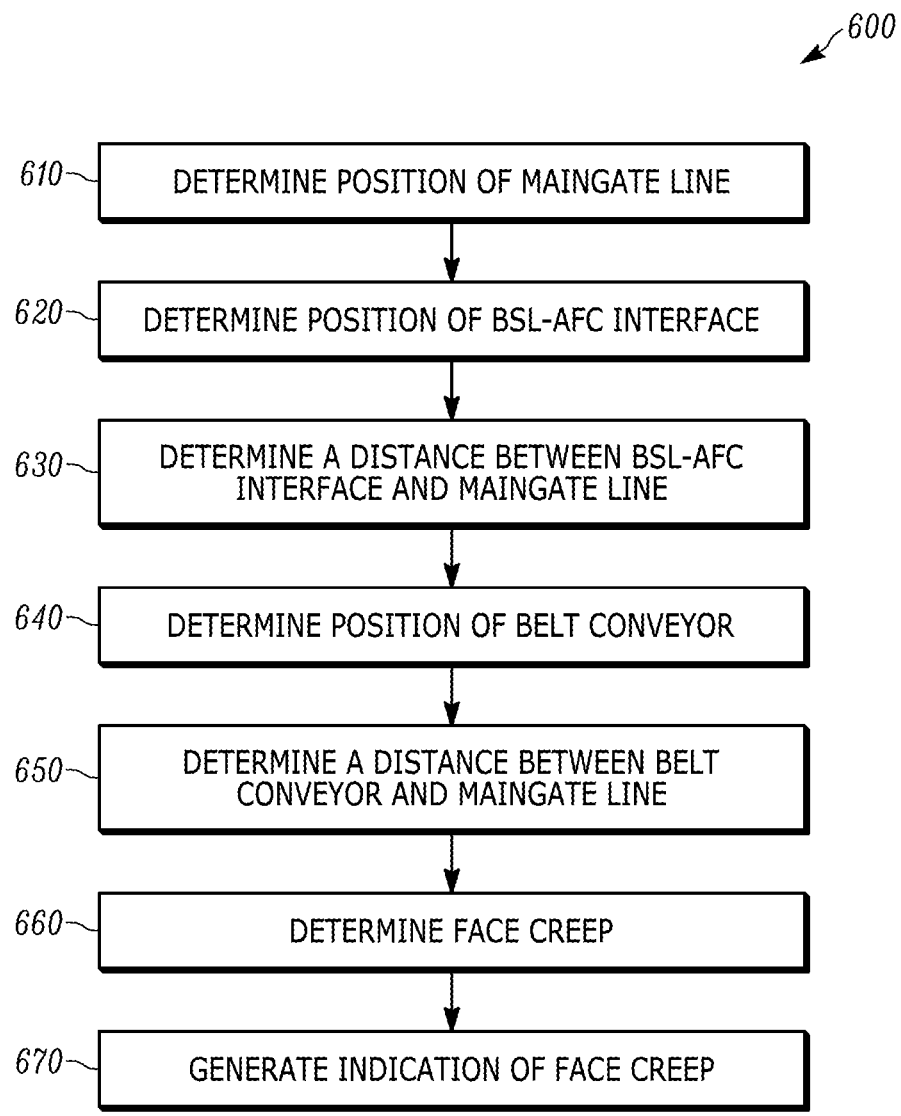
FIG. 6A illustrates a process for detecting face creep of the longwall mining system of FIG. 1 according to one embodiment of the invention.

FIG. 6A illustrates a process 600 for detecting face creep of the longwall mining system 100. At step 610, the controller 500 determines a position of the maingate centerline 480 (i.e., a maingate line) based on a signal from the maingate indicator device 440. For example, the detection device 410 receives a signal indicating a position of the maingate indicator device 440. The detection device 410, in turn, communicates the position of the maingate indicator device 440 (e.g., relative to the detection device 410) to the controller 500. For example, the detection device 410 and maingate indicator device 440 may both be positioned at a location in the maingate roadway 220 known to the controller 500, such as on the maingate centerline 480. The detection device 410 may determine a distance and angle from the detection device 410 at which the maingate indicator device 440 is located, and provide this information to the controller 500. The controller 500, in turn, may plot (e.g., graphically or numerically) the detection device 410 as being located at an origin position and the maingate indicator device 440 as being located at a second position, and a line drawn between the origin position and the second position is determined by the controller 500 to be the maingate centerline 480. When one or both of the detection device 410 or the maingate indicator device 440 are not positioned on the maingate centerline 480, predetermined values (e.g., determined in a setup stage) may be applied by the controller 500 to account for the offset and determine the position of the maingate centerline 480.

The signal received from the maingate indicator device 440 may be, for example, a periodic signal generated by the maingate indicator device 440, may be generated by the maingate indicator device 440 in response to a command from the controller 500 (e.g., sent over a wired or wireless connection), or may be a reflection of a signal transmitted by the detection device 410. In some embodiments, the detection device 410 is positioned on the maingate centerline 480 and is oriented during setup such that the maingate centerline 480 is known and determined by the detection device 410 and controller 500 without communicating with the maingate indicator device 440.

At step 620, the controller 500 determines a position of the beam stage loader-armored face conveyor interface based on a signal from the BSL indicator device 420. For example, the detection device 410 receives a signal indicating a position of the beam stage loader-armored face conveyor interface from the BSL indicator device 420. The detection device 410 may determine a distance and angle from the detection device 410 at which the BSL indicator device 420 is located, and provide this information to the controller 500. The controller 500, in turn, may add the relative location of the beam stage loader-armored face conveyor interface to the plot generated in step 610.

The signal received from the BSL indicator device 420 may be, for example, a periodic signal generated by the BSL indicator device 420, may be generated by the BSL indicator device 420 in response to a command from the controller 500 (e.g., sent over a wired or wireless connection), or may be a reflection of a signal transmitted by the detection device 410.

In step 630, the controller 500 determines a distance (e.g., in meters (m)) between the beam stage loader-armored face conveyor interface and the maingate centerline 480 using the position data obtained in steps 610 and 620). The distance between the beam stage loader-armored face conveyor interface and the maingate centerline 480 may be calculated using the method 700 as described below. The determined distance may be the distance between a line perpendicular to the maingate centerline 480 and the beam state loader-armored face conveyor interface.

Figure 6B:
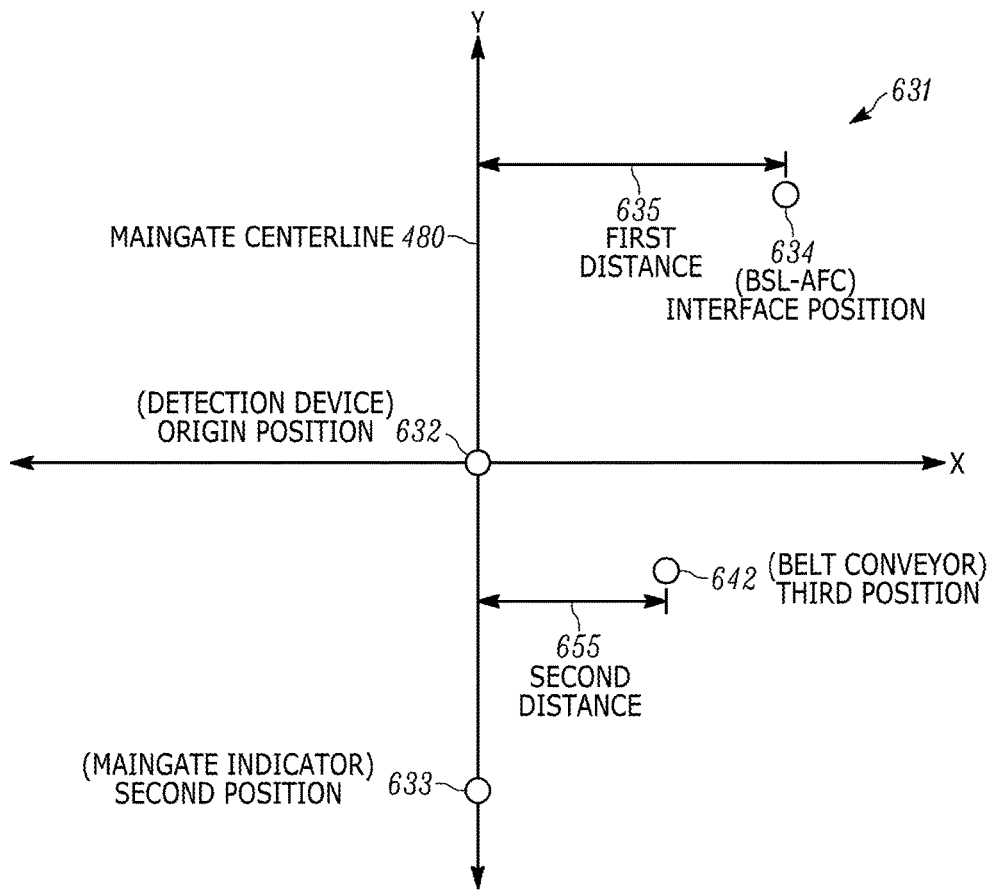
FIG. 6B illustrates a plot of various positions and distances determined in process of FIG. 6A.

FIG. 6B, for instance, illustrates a plot 631 of various positions and distances determined in process 600 including the determined positions from steps 610 and 620, as well as the distance calculated in step 630. More particularly, plot 631 illustrates the detection device 410 at an origin position 632, the maingate indicator device 440 at second, centerline position 633, and the BSL indicator device 420 (representative of the beam state loader-armored face conveyor interface) at an interface position 634. In the plot 631, the y-axis represents the maingate centerline 480 and the x-axis represents a direction perpendicular to the maingate centerline 480 and generally parallel to the ore face 240. A first distance 635 illustrates the distance between a line perpendicular to the maingate centerline 480 and the interface position 634 (the beam state loader-armored face conveyor interface), which may be calculated in step 630.

At step 640, controller 500 determines a position of the belt conveyor 150 based on a signal from the conveyor indicator 430. For example, the detection device 410 receives a signal indicating a position of the belt conveyor 150 from the conveyor indicator 430. The detection device 410 may determine a distance and angle from the detection device 410 at which the belt conveyor 150 is located, and provide this information to the controller 500. The controller 500, in turn, may add the relative location of the belt conveyor 150 to the plot generated in step 610. The plot 631 of FIG. 6B illustrates an example of the determined location of the belt conveyor 150 at a third position 642.

The signal received from the conveyor indicator 430 may be, for example, a periodic signal generated by the conveyor indicator 430, may be generated by the conveyor indicator 430 in response to a command from the controller 500 (e.g., sent over a wired or wireless connection), or may be a reflection of a signal transmitted by the detection device 410.

In step 650, the controller 500 determines a distance (e.g., in meters (m)) between the belt conveyor 150 and the maingate centerline 480 using the position data obtained in steps 610 and 640). The distance between the belt conveyor 150 and the maingate centerline 480 may be calculated using the method 700 as described below. The determined distance may be the distance between a line perpendicular to the maingate centerline 480 and the belt conveyor 150. For example, a second distance 652 illustrates the distance between a line perpendicular to the maingate centerline 480 and the belt conveyor 150 that may be calculated in step 650.

At step 660, the controller 500 determines the face creep by calculating the difference between (a) the distance between the belt conveyor 150 and the maingate centerline 480 from step 650 (see, e.g. the second distance 655 of FIG. 6B) and (b) the distance between the beam stage loader-armored face conveyor interface and the maingate centerline 480 from step 630 (see, e.g. the first distance 635 of FIG. 6B). For example, with the illustrated arrangement, a difference of zero calculated in step 660 (e.g., the first distance 635 is equal to the second distance 655) indicates no face creep. A positive difference calculated in step 660 (e.g., the second distance 655 is greater than the first distance 635) indicates that the beam stage loader 140 is closer to the maingate centerline 480 than the belt conveyor 150, and the longwall system 100 is experiencing face creep with maingate lead. A negative difference calculated in step 660 (e.g., the first distance 635 is greater than the second distance 655) indicates that the beam stage loader 140 is farther to the maingate centerline 480 than the belt conveyor 150, and the longwall system 100 is experiencing face creep with maingate lag.

At step 670, the controller 500 generates an indication of face creep. This indication may be output on user interface 510, transmitted to a remote location, saved for plotting, etc. The process 600 loops back to step 610 to continually determine face creep of the longwall mining system 100. In some embodiments, the controller 500 plots trends of the values calculated in the process 600 in order to determine a direction of the face creep.

In some embodiments, the belt conveyor indicator 430 is located at another position within the maingate roadway 220 other than at the belt conveyor 150, such as on a different component displaced from the maingate line or on a wall of the maingate roadway 220. In these embodiments, a predetermined offset is used in step 640 to calculate the location of the belt conveyor 150 relative to the location of the belt conveyor indicator 430, or the particular location of the belt conveyor indicator 430 is used as the reference point in place of the belt conveyor position when calculating the second distance in step 650 for use in step 660.

Figure 7:
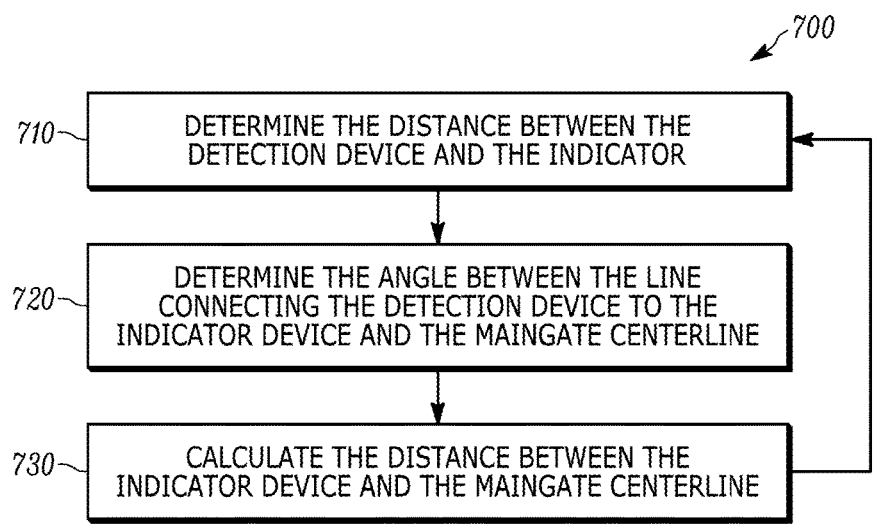
FIG. 7 illustrates a process for calculating a distance between a mining component of the longwall mining system of FIG. 1 and a monorail or maingate centerline according to embodiment of the invention.

FIG. 7 illustrates one exemplary process 700 of calculating a distance between an indicator device (e.g., the BSL indicator device 420 or the conveyor indicator device 430) and the maingate centerline 480. At step 710, the controller 500 determines a distance between the detection device 410 and the indicator device based on the position signal received from the indicator device. The controller 500 determines the angle (e.g., $\phi$ or 180-$\theta$ in FIG. 4) between the line connecting the detection device 410 to the indicator device (e.g., lines 722 and 724 in FIG. 4) and the maingate centerline 480 (step 720). For example, the controller 500 may receive coordinates of the indicator device from the detection device 410. The controller 500 may then determine the angle and distance of the indicator device by determining a relative position of the indicator device with respect to the detection device 410 based on the received coordinates.

At step 730, the controller 500 calculates the distance between the indicator device and the maingate centerline 480 by multiplying the distance from step 710 with the sine of the angle ($\phi$ or 180-$\theta$) calculated in step 720. Using this process 700, the controller 500 calculates the distance between the belt conveyor centerline 470, beam stage loader centerline 450 and the maingate centerline 480. Alternatively, the controller may also calculate the distance directly based on the coordinates of the various components received from the detection device 410.

In the above descriptions, processes 600 and 700 describe techniques of calculating a distance between the centerlines of various components. However, it will be apparent to one skilled in the art that other techniques of calculating relative position of the various components may be used to determine the face creep of the longwall mining system 100. For example, face creep may be determined by calculating a distance between the end-lines, edges, etc., of the various components.

In some embodiments, the electronic processor 580 of the controller 500 determines the face creep using the position data received from the detection device 410. In some embodiments, the controller 500 is incorporated into the detection device 410. In other embodiments, an electronic processor may be included in the detection device 410 to determine the face creep. An indication of face creep is then communicated to the controller 500 from the detection device 410.

Figure 8:
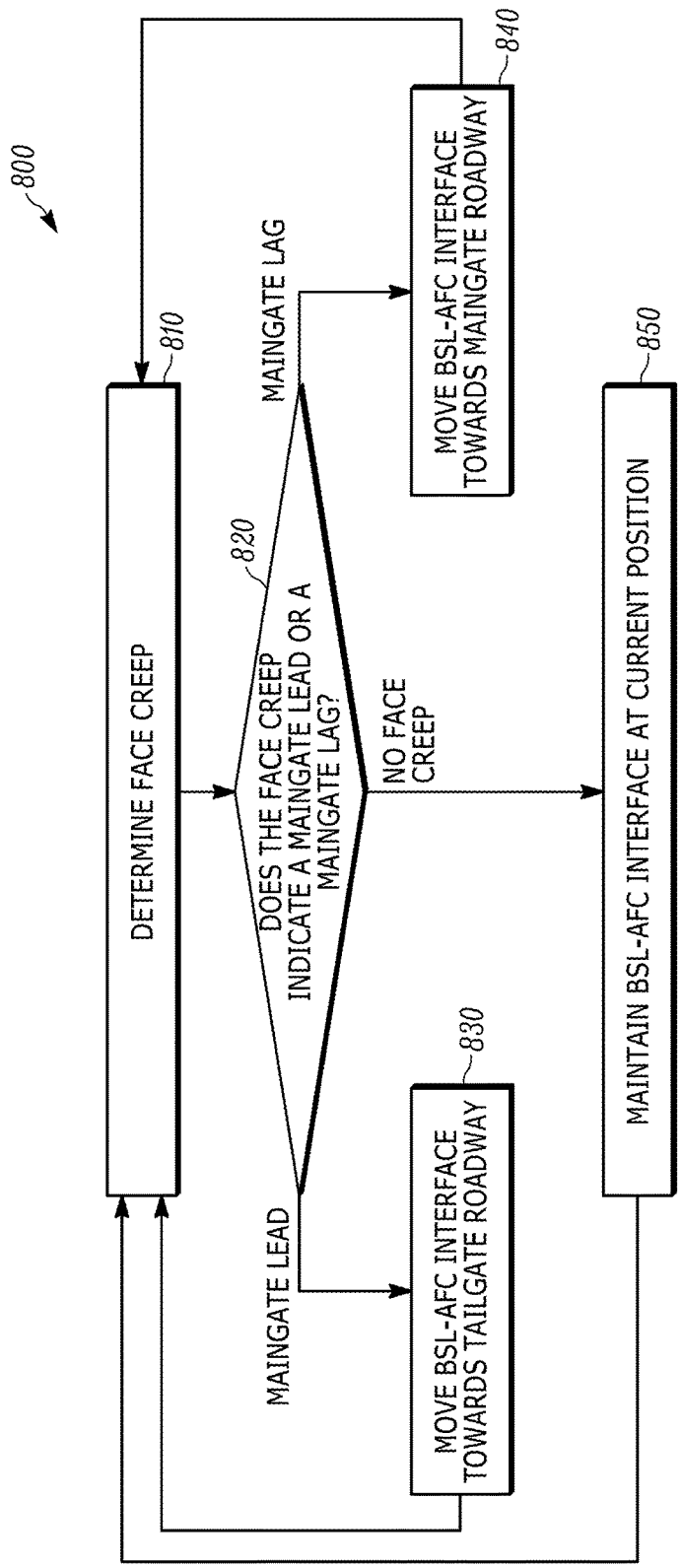
FIG. 8 illustrates a process for controlling the longwall mining system of FIG. 1 according to one embodiment of the invention.

FIG. 8 illustrates a process 800 of correcting a face creep detected by control system 490. At step 810, the controller 500 determines face creep for the longwall mining system 100 using, for example, the process 600 described above with respect to FIG. 6A to generate an indication of face creep. In step 820, the controller 500 determines whether the longwall mining system 100 is experiencing face creep having a maingate lead, face creep having a maingate lag, or no face creep based on the indication of face creep. Referring back to FIGS. 3A and 3B, the longwall mining system 100 is in a maingate lead (FIG. 3A) when the beam stage loader-armored face conveyor interface is creeping towards the maingate roadway 220. As described above, the controller 500 determines that the face creep is a maingate lead when the distance between the beam stage loader-armored face conveyor interface and the maingate centerline 480 is less than the distance between the belt conveyor 150 and the maingate centerline 480 (i.e., the face creep detected is positive). Similarly, the longwall mining system 100 is in a maingate lag (FIG. 3B) when the beam stage loader-armored face conveyor interface is creeping towards the tailgate roadway 230. As described above, the controller 500 determines that the face creep is a maingate lag when the distance between the beam stage loader-armored face conveyor interface and the maingate centerline 480 is greater than the distance between the belt conveyor 150 and the maingate centerline 480 (i.e., the face creep detected is negative).

When the controller 500 determines that the longwall mining system 100 is experiencing face creep with a maingate lead, the controller 500 controls the drive 560 to move the armored face conveyor 130, and thereby the beam stage loader-armored face conveyor interface, towards the tailgate roadway (step 830). Similarly, when the controller 500 determines that the longwall mining system 100 is experiencing face creep with a maingate lag, the controller 500 controls the drive 560 to move the armored face conveyor 130, and thereby the beam stage loader-armored face conveyor interface, towards the maingate roadway (step 840). If no face creep is being experienced, the controller 500 maintains the beam stage loader-armored face conveyor interface at its current position. After steps 830, 840, or 850, the controller 500 returns to step 810 to determine face creep for the longwall mining system 100 based on updated information from the detection device 410.

The processes 600, 700 and 800, described above, provide only one example of calculating face creep of the longwall mining system 100. Other methods, formulas and techniques are possible and contemplated by the present invention. Therefore, the methods, formulas and techniques described above are exemplary and should not be considered limiting.

Figure 9A:
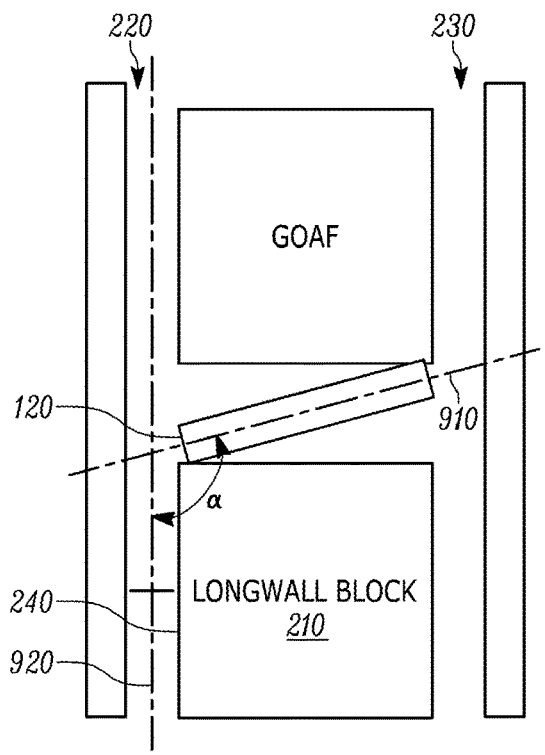
FIGS. 9A and 9B illustrate an arrangement of the longwall mining equipment to correct face creep of the longwall mining system of FIG. 1.

FIG. 9A illustrates an exemplary technique of correcting a maingate lead, such as to implement step 830 of FIG. 8. When the controller 500 determines that the longwall mining system 100 is in a maingate lead, the controller 500 controls the drive 560 to advance the powered roof supports 120, and thereby the armored face conveyor 130, such that the roof supports closer to the maingate roadway 220 are advanced farther than the roof supports closer to the tailgate roadway 230. The powered roof supports 120 are advanced by the drive 560 such that a line 910 drawn through the centers of the powered roof supports 120 after the advance is at an angle α greater than 90 degrees with the maingate centerline 920. The controller continues such an advance with the angle α greater than 90 degrees for each layer of the longwall block until the face creep determined by the controller 500 equals zero.

Figure 9B:
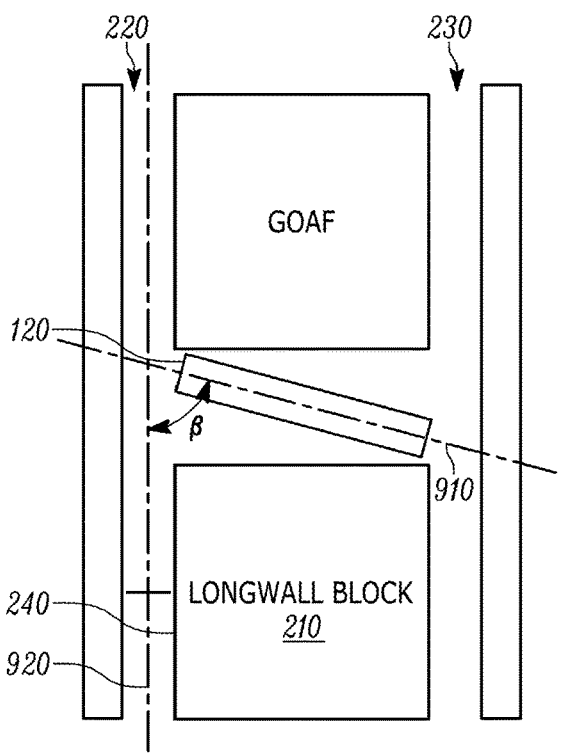

FIG. 9B illustrates an exemplary technique of correcting a maingate lag, such as to implement step 840 of FIG. 8. When the controller 500 determines that the longwall mining system 100 is in a maingate lag, the controller 500 controls the drive 560 to advance the powered roof supports 120, and thereby the armored face conveyor 130, such that the roof supports closer to the tailgate roadway 230 are advanced farther than the roof supports closer to the maingate roadway 220. The powered roof supports 120 are advanced by the drive 560 such that the line 910 drawn through the centers of the powered roof supports 120 after the advance is at an angle β less than 90 degrees with the maingate centerline 920. The controller continues such an advance with the angle β less than 90 degrees for each layer of the longwall block until the face creep determined by the controller 500 equals zero.

When the detection device 410 determines that there is no face creep, the roof supports 120 may be advanced the same distance. Advancing the roof supports at the same distance is an example technique to implement step 850 of FIG. 8. Further, in some embodiments, the controller 500 may be programmed to correct the face creep only when the face creep exceeds a pre-determined threshold. Additionally, the aggressiveness of the correction (for example, indicated by angles α and β), can be proportional to the amount of face creep being detected.

Thus, the invention may generally provide, among other things, systems and methods for detecting a face creep in a longwall mining system.

What is claimed is:

1. A system for detecting face creep of a longwall mining system, the system comprising:
   a detection device mounted in a maingate roadway;
   a first indicator device located at a beam stage loader-armored face conveyor interface to indicate a position of the beam stage loader-armored face conveyor interface to the detection device;
   a belt conveyor indicator device mounted on a belt conveyor to indicate a position of the belt conveyor to the detection device; and
   a controller including an electronic processor and a memory, the controller coupled to the detection device and configured to:
      determine the position of the beam stage loader-armored face conveyor interface based on a signal from the first indicator device,
      determine a first distance between the position of the beam stage loader-armored face conveyor interface and a maingate line,
      determine the position of the belt conveyor based on a signal from the belt conveyor indicator device,
      determine a second distance between the belt conveyor and the maingate line, and
      generate an indication of face creep based on the first distance and the second distance.

2. The system of claim 1, further comprising:
   a second indicator device mounted in the maingate roadway to indicate a position of the maingate line to the detection device; and wherein the controller is further configured to determine the position of the maingate line based on a second signal from the second indicator device.

3. The system of claim 1, wherein
the indication of face creep generated by the controller indicates maingate lag when the first distance is greater than the second distance, and
the indication of face creep generated by the controller indicates maingate lead when the first distance is less than the second distance.

4. The system of claim 1, wherein the controller is further configured to
control powered roof supports along an ore face to advance at an angle less than 90° from the maingate line when the first distance is greater than a predetermined amount; and
control the powered roof supports along the ore face to advance at an angle greater than 90° from the maingate line when the first distance is less than the predetermined amount.

5. The system of claim 1, wherein the detection device is a radio detection and ranging (RADAR) device.

6. The system of claim 1, wherein the controller is further configured to display the indication of face creep as being a maingate lag or a maingate lead on a user interface of the longwall mining system.

7. A method for detecting face creep of a longwall mining system, the method comprising:
detecting, by a detection device, a position of a beam stage loader-armored face conveyor interface based on a first signal from a first indicator device;
detecting, by the detection device, a position of a belt conveyor based on a signal from a belt conveyor indicator device;
determining, by a controller coupled to the detection device, the position of the beam stage loader-armored face conveyor interface based on an output from the detection device;
determining, by the controller, the position of the belt conveyor;
determining, by the controller, a first distance between the position of the beam stage loader-armored face conveyor interface and a maingate line;
determining a second distance between the belt conveyor and the maingate line; and
generating, by the controller, an indication of face creep based on the first distance and the second distance.

8. The method of claim 7, further comprising:
detecting, by the detection device, a position of the maingate line; and
determining, by the controller, the position of the maingate line based on another output from the detection device.

9. The method of claim 7, wherein generating the indication of face creep includes
indicating maingate lag when the first distance is greater than the second distance, and
indicating maingate lead when the first distance is less than the second distance.

10. The method of claim 7, further comprising
controlling, by the controller, powered roof supports along an ore face to advance at an angle less than 90° from the maingate line when the first distance is greater than a predetermined amount; and
controlling, by the controller, the powered roof supports along the ore face to advance at an angle greater than 90° from the maingate line when the first distance is less than the predetermined amount.

11. A controller for detecting face creep of a longwall mining system, the controller comprising an electronic processor and executable instruction stored in a memory configured to:
determine a position of a beam stage loader-armored face conveyor interface based on an output from a detection device in communication with a first indicator device located at the beam stage loader-armored face conveyor interface;
determine a position of a maingate line;
determine a position of a belt conveyor based on an output from a detection device in communication with a belt conveyor indicator device located on the belt conveyor;
determine a first distance between the position of the beam stage loader-armored face conveyor interface and the maingate line;
determine a second distance between the position of the belt conveyor and the maingate line; and
generate an indication of face creep based on the first distance and the second distance.

12. The controller of claim 11, further comprising executable instruction stored in a memory configured to determine the position of the maingate line based on an output from a detection device in communication with a second indicator device located on a maingate monorail.

13. The controller of claim 11, further comprising executable instruction stored in a memory configured to:
control powered roof supports along an ore face to advance at an angle less than 90° from the maingate line when the first distance is greater than a predetermined amount; and
control the powered roof supports along the ore face to advance at an angle greater than 90° from the maingate line when the first distance is less than the predetermined amount.

14. The controller of claim 11, further comprising executable instruction stored in a memory configured to display the indication of face creep, wherein
the indication of face creep indicates maingate lag when the first distance is greater than the second distance, and
the indication of face creep indicates maingate lead when the first distance is less than the second distance.

* * * * *